Oct. 29, 1940.    B. K. BEECHER    2,219,646
SODIUM ORTHOSILICATE AND METHOD OF MAKING SAME
Filed March 18, 1939
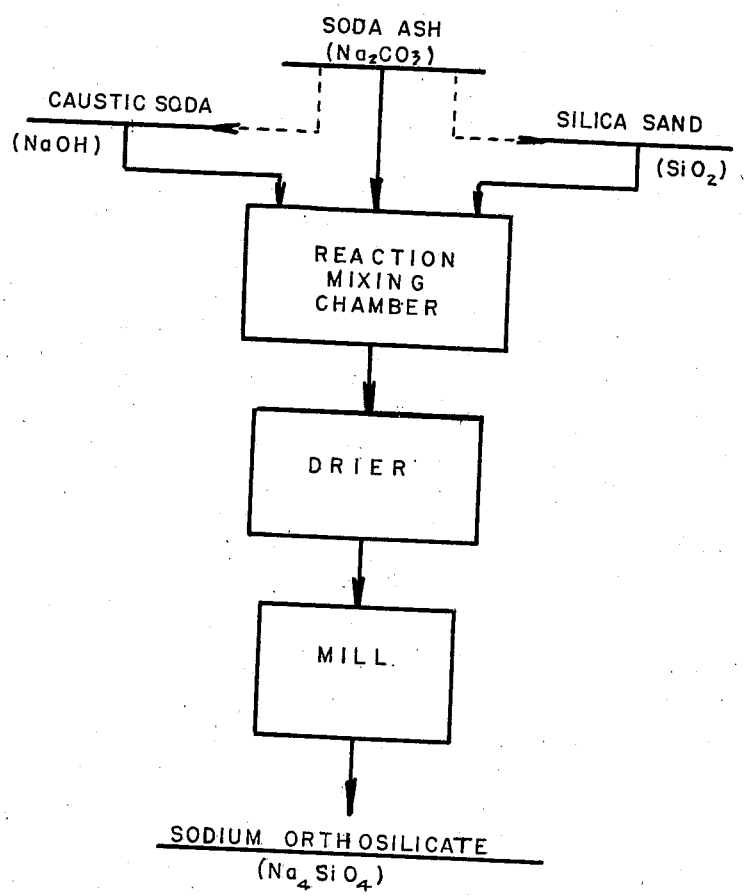
INVENTOR.
BRAZIER K. BEECHER
BY
Oberlin, Limbach & Day
ATTORNEYS.

/ Patented Oct. 29, 1940

2,219,646

UNITED STATES PATENT OFFICE 2,219,646

SODIUM ORTHOSILICATE AND METHOD OF MAKING SAME

Brazier K. Beecher, Wyandotte, Mich., assignor to Michigan Alkali Company, Wyandotte, Mich., a corporation of Michigan Application March 18, 1939, Serial No. 262,697

9 Claims. (Cl. 23—110)

The present invention relates to sodium orthosilicate having a new physical form and properties, as a new article of manufacture, as well as the process for making it. Heretofore, the sodium silicates, comprising essentially sodium anhydride and silica in various proportions as constituents, and especially sodium orthosilicate, have been produced by three general processes, namely, the fusion or furnace process, the wet digestion process, and the dry process. It is to the wet digestion and dry process type of sodium orthosilicate with which the present invention relates.

Both the wet digestion and dry process for the manufacture of sodium orthosilicate involves the reaction, below the fusion point or temperature of caustic soda, of sodium hydroxide and silica. The essential difference between the two reactions is, as indicated, by their names, that in the wet digestion process, the reactants are mixed wet or in water solution, and in the dry process the reactants are mixed in a technically dry state. This of course means that in the wet digestion process, the resultant sodium orthosilicate product must be extracted by an evaporation or crystallizing step. British Patent No. 391,407 (dated Apr. 27, 933) is an exemplary exposition of the wet digestion process.

United States Patents Nos. 2,083,545 and 2,100,944 describe in detail the so-called "dry process," which generally stated comprises the admixture of substantially dry caustic soda and silica, and heating to a temperature below the fusion point of the caustic soda. The sodium orthosilicate product of such wet digestion and dry processes is in the form of a soft amorphous, opaque, powdery or granular material, greatly subject to further powdering and comminution on handling. It is the general object and nature of the present invention to substantially improve the physical properties of such sodium orthosilicate products which have heretofore been obtained from the reaction of sodium hydroxide and silica; and more particularly, to eliminate the disadvantages incident to the amorphous fine powdery properties which, among other things, have proven objectionable to the user from the health and safety standpoint in that such fine powder causes irritation of the respiratory and olefactory organs, and also affects any other exposed human skin and tissues. The sodium orthosilicate product of the present invention is in the form of hard, brittle, translucent pieces or particles having definite crystalline characteristics.

As compared with the above mentioned prior art process sodium orthosilicate product, the product of the present invention contains a greatly reduced amount of "fines" which reduces the disadvantages, difficulties, and expense incident to manufacture, handling, packaging and use; and wherein the normal hygroscopic tendencies of the sodium orthosilicate are inhibited. Briefly outlined, the method for producing the new orthosilicate product comprises the introduction or addition of a relatively small amount of sodium carbonate or soda ash to the caustic soda and silica constituents in the process of manufacture.

To the accomplishment of the foregoing and related ends, said invention, then, consists of the means hereinafter fully described and particularly pointed out in the claims.

The annexed drawing and the following description set forth in detail one method and one product exemplifying my invention, such disclosed procedure and product constituting, however, but one of various applications of the principle of my invention.

In said annexed drawing the figure is a flow sheet illustrating the manner of performance of the process for making the new sodium orthosilicate product.

Referring more particularly to the drawing, the chemical compounds constituting the starting products of the process are sodium hydroxide, sodium carbonate and silica. The sodium hydroxide is in the form of fused or technically dry caustic soda. The sodium carbonate is in the form of soda ash. The silica is in the form of silica sand, quartz, volcanic ash, silica flour, etc. The sodium hydroxide and silica are introduced into the reaction mixing chamber in dry form and in proportions sufficient to react and form sodium orthosilicate, conforming substantially to the following equation:

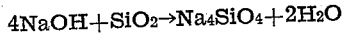
$$4NaOH + SiO_2 \rightarrow Na_4SiO_4 + 2H_2O$$

Preferably, 2 to 4% sodium carbonate or soda ash, on the weight of the resultant sodium orthosilicate product, is either added directly to the silicate reaction mixing chamber, to the caustic soda or to the silica. Satisfactory results have been obtained with as high as 14% soda ash addition, but for practical and economical operating purposes, and the achievement of the desired results, 2 to 4% soda ash addition is most suitable.

The mixed constituents are then heated to a temperature below the fusion or melting point of the caustic soda, whereat the above reaction takes place with the evolution of steam. The product of the reaction mixing chamber is then passed through a drier, suitably of the externally heated, screw conveyor type, from which a product issues which possesses a fused, glass-like metamorphic appearance, and is in a "flaking" or plate-like form. This latter product is then milled to produce a final product which has definite, translucent, crystalline characteristics. The milling apparently fractures the product from the drier along curved, irregular surfaces, resulting in the formation of comminuted pieces or particles of substantially uniform size.

The above particularly described addition of soda ash, and corresponding operations to produce the sodium orthosilicate can also be performed in the wet digestion process where the new form of sodium orthosilicate is produced upon evaporation of the excess water.

The introduction of the soda ash is of particular advantage in the handling and passage of the product through the apparatus. The relatively large amount of "fines"; that is, very fine powdery particles, which have heretofore resulted in the performance of the sodium orthosilicate dry process manufacture, has proven to be most inconvenient and disadvantageous, particularly when the material is passed through the drier.

In the process of the present invention, on the other hand, the amount of "fines" is reduced to less than half. Furthermore, this reduction in the amount of fines, as well as the elimination of the powdery characteristics of the sodium orthosilicate product, overcomes a heretofore objectionable feature to the user of the product. The excessive amount of "fines" and the formation of a dust-like cloud of prior art product, during packaging, handling and use, has proven deleterious to the human health and comfort. The prior art product will form powdery, dust-like fines in the package and during handling, even though the fines have been previously removed before packing, since the powdery surface of such product tends to "slough off" quite readily on handling. Inhalation of the fine, powdery particles of the product seriously irritate the human respiratory organs and contact with exposed skin has also been sufficient to produce irritations and injurious effects. The substantial amount of the reduction of "fines" in my new product therefore constitutes a human health and safety improvement factor.

The following table sets forth an exemplary comparison between the amount of "fines" in my new product even where it has been milled and ground as compared to an unground sodium orthosilicate product of the prior art. The table sets forth the various percentages of the respective products which were retained on and passed through the indicated sizes of mesh screen.

| | Without addition of Na$_2$CO$_3$ | With addition of Na$_2$CO$_3$ (and ground) |
|---|---|---|
| On 10 mesh | | 47.5 |
| On 12 mesh | 20.0 | 7.9 |
| On 20 mesh | 5.85 | 12.2 |
| On 28 mesh | 13.4 | 6.0 |
| On 35 mesh | 8.95 | 4.05 |
| On 60 mesh | 8.4 | 4.75 |
| Thru 60 mesh | 11.7 | 17.5 |
| | 31.4 | |

From the above table it will be seen that the amount of "fines," viz., particles of powdery nature and capable of passing through the 60 mesh screen in my new product even after grinding, or being subjected to a comminuting action, is approximately ½ of the amount of fines in the prior art product, during whose forming reaction process no soda ash has been added.

The introduction of the sodium carbonate also inhibits the hygroscopic tendency of the sodium orthosilicate. The sodium orthosilicate product of the present invention possesses a further advantage with respect to the problem of packaging in flexible walled container such as bags and boxes. In other words, the crystal-like pieces or particles, having sharp edges, and practically flat faces, as distinguished from the rounded surfaces of the crystals or particles of previous dry process sodium orthosilicate, have a self-supporting tendency, much in the manner of a pile of bricks or blocks, as compared to a mass of balls. Thus the tendency of the new product to exert a lateral pressure upon the side walls of its container, such as a bag or a box, eliminates the possibility of producing a sag, bulge or even a rupture in the latter, as compared to the old dry process sodium orthosilicate product. Furthermore, the tendency of the prior art sodium orthosilicate product to form additional "fines," and powdery dust-like particles on handling, as previously pointed out, is eliminated in the new product.

Other modes of applying the principle of my invention may be employed instead of the one explained, change being made as regards the product and method herein disclosed, provided the step or steps stated by any of the following claims or the equivalent of such stated step or steps be employed.

I therefore particularly point out and distinctly claim as my invention:

1. A method of making sodium orthosilicate consisting in the steps of mixing caustic soda, silica and soda ash, the latter being present in an amount in addition to that normally present in the caustic soda and heating below the fusion point of the caustic soda to cause reaction between the latter and the silica.

2. A method of making sodium orthosilicate consisting in the steps of mixing caustic soda, silica and soda ash, the latter being present in an amount in addition to that normally present in the caustic soda and heating below the fusion point of the caustic soda to cause reaction between the latter and the silica, and agitating the reaction mixture to form a hard, brittle sodium orthosilicate of fused translucent physical appearance.

3. A method of making sodium orthosilicate consisting in the steps of mixing caustic soda, silica and soda ash, the latter being present in an amount in addition to that normally present in the caustic soda, heating below the fusion point of the caustic soda to cause reaction between the latter and the silica, agitating the reaction mixture to form a hard, brittle, sodium orthosilicate of fused, translucent physical appearance, and then milling said sodium orthosilicate to a predetermined particle size.

4. A method of making sodium orthosilicate consisting in the steps of mixing caustic soda and silica with a maximum of 14% soda ash on the weight of the resultant sodium orthosilicate product, said soda ash being present in an amount in addition to that normally present in the caustic soda, and heating below the fusion point of the caustic soda to cause reaction between the latter and the silica.

5. A method of making sodium orthosilicate consisting in the steps of mixing caustic soda and silica with 2 to 4% soda ash on the weight of the resultant sodium orthosilicate product, said soda ash being present in an amount in addition to that normally present in the caustic soda, and heating below the fusion point of the caustic soda to cause reaction between the latter and the silica.

6. A method of making sodium orthosilicate consisting in the steps of mixing solid caustic soda and silica with a maximum of 14% soda ash on the weight of the resultant sodium orthosilicate product, said soda ash being present in an amount in addition to that normally present in the caustic soda, heating below the fusion point of the caustic soda to cause reaction between the latter and the silica, and agitating the reaction mixture to form a hard, brittle sodium orthosilicate of fused, translucent physical appearance.

7. A method of making sodium orthosilicate consisting in the steps of mixing solid caustic soda and silica with 2 to 4% soda ash on the weight of the resultant sodium orthosilicate product, said soda ash being present in an amount in addititon to that normally present in the caustic soda, heating below the fusion point of the caustic soda to cause reaction between the latter and the silica, and agitating the reaction mixture to form a hard, brittle sodium orthosilicate of fused, translucent physical appearance.

8. A method of making sodium orthosilicate consisting in the steps of mixing caustic soda and silica with a maximum of 14% soda ash on the weight of the resultant sodium orthosilicate product, said soda ash being present in an amount in addition to that normally present in the caustic soda, heating below the fusion point of the caustic soda to cause reaction between the latter and the silica, agitating the reaction mixture to form a hard, brittle sodium orthosilicate of fused, translucent physical appearance, and then milling said sodium orthosilicate to a predetermined particle size.

9. A method of making sodium orthosilicate consisting in the steps of making caustic soda and silica with 2 to 4% soda ash on the weight of the resultant sodium orthosilicate product, said soda ash being present in an amount in addition to that normally present in the caustic soda, heating below the fusion point of the caustic soda to cause reaction between the latter and the silica, agitating the reaction mixture to form a hard, brittle sodium orthosilicate of fused, translucent physical appearance, and then milling said sodium orthosilicate to a predetermined particle size.

BRAZIER K. BEECHER.